Nov. 12, 1968  H. N. ELAM  3,410,117

CAP-CLEANING APPARATUS

Filed April 7, 1967  2 Sheets-Sheet 1

Harry N. Elam,
Inventor.
Koenig, Senniger, Powers and Leavitt,
Attorneys.

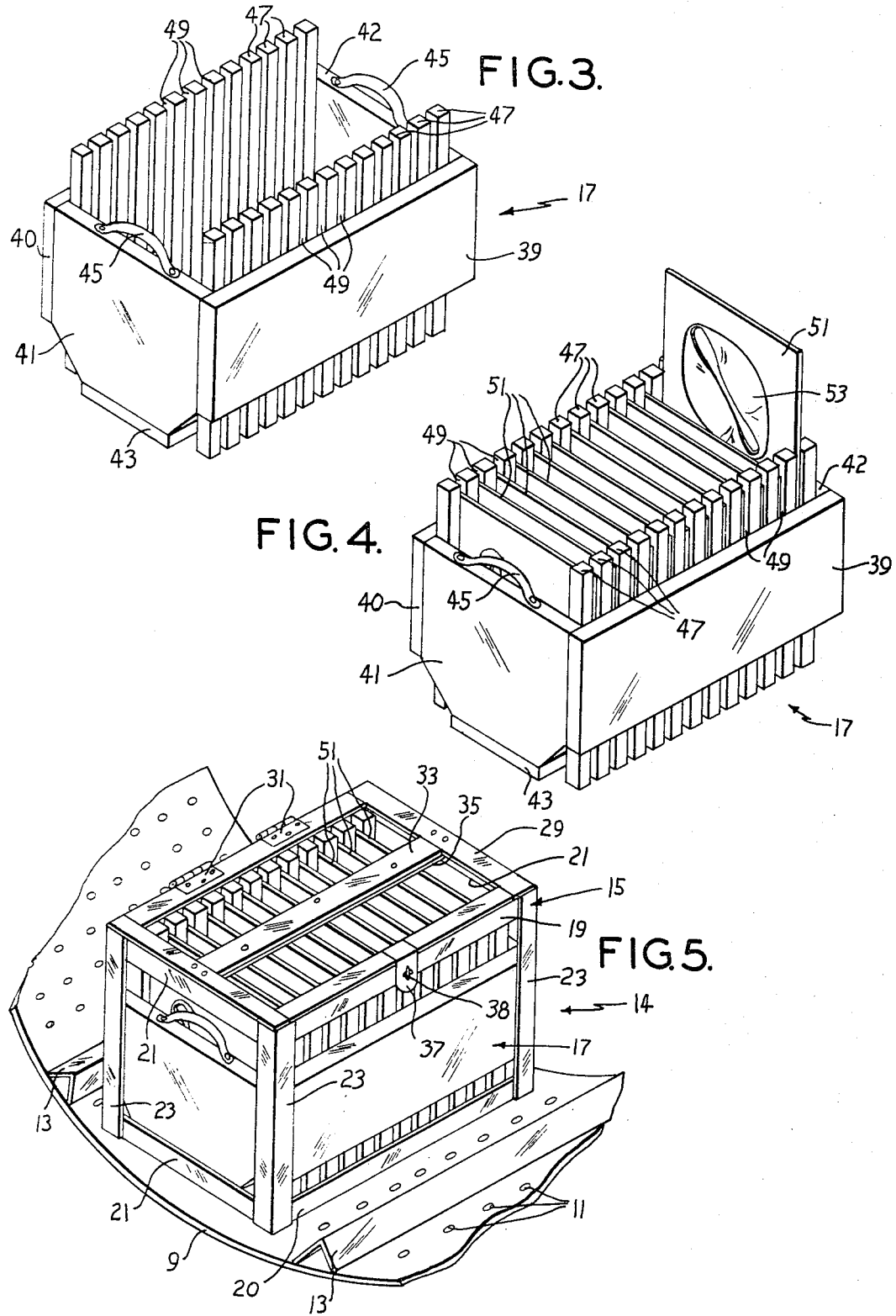

3,410,117
CAP-CLEANING APPARATUS
Harry N. Elam, 1001 Chicago, St.,
Greenville, Ill. 62246
Filed Apr. 7, 1967, Ser. No. 629,216
9 Claims. (Cl. 68—4)

ABSTRACT OF THE DISCLOSURE

Apparatus for cleaning academic mortarboard graduation caps. The apparatus is operative in combination with a conventional clothes cleaning machine having a perforated rotary drum and a plurality of spaced agitator ribs or paddles extending substantially parallel to the axis of rotation for liquid stirring. The apparatus is constituted by cages, each comprising an open prismatic framework which is removably mounted in the drum between the paddles. A cap-spacing and -holding rack is snugly but removably received in each cage. Each cage has an operable lid for locking its rack in place therein. The arrangement is such that when a rack is locked in a cage the planes of the mortarboards in the rack extend substantially perpendicularly to the axis of rotation of the drum, so that the liquid cleaning fluid circulates efficiently between them as they revolve.

Background of the invention

Graduation caps, or so-called academic mortarboards are troublesome to dry-clean automatically because they cannot be cleaned in an ordinary automatic dry-cleaning machine without being jumbled, thereby subjecting them to entanglement, uneven liquid circulation between them, breaking of the corners and subjection to other damage. Such machines are generally classified in two categories, top and front loading. In top loading machines, a vertical agitator either rotates or reciprocates vertically to agitate the articles being cleaned. In front loading machines, a horizontal drum rotates to tumble the articles. In both types, the articles to be cleaned are tumbled and tossed around while contacting the cleaning fluid. Thus a graduation cap having a relatively stiff and rigid square brim is easily damaged if cleaned in such machines.

Summary of the invention

The present cap-cleaning attachment is designed preferably for use with a front loading cleaning machine, the drum of which turns on a substantially horizontal axis. The attachment comprises an open framework forming a cage and a cap-holding rack removably received therein. The cage is provided with means for removably securing it within the cleaning machine. The rack is provided with means for holding a plurality of caps to be cleaned in separated positions. The cage is designed to receive the rack. It has an open-frame lid extending across its top for holding the rack and caps in place when the lid is closed. The caps are cleaned by rotating the drum. Thus the caps revolve while held captive, so as to cause circulation of cleaning fluid among the caps. The caps are held against tumbling against one another, which prevents their being damaged. At the same time they are exposed to a constant very free and even circulation of the cleaning fluid. Since the rack is removable from the frame, it may be loaded and unloaded with care outside of the machine. In addition, the cages are removable from the cleaning machine so that it may be used from time to time for cleaning other articles, as desired.

Brief description of the drawings

FIG. 3 is a perspective of a cap-holding rack;

FIG. 4 is a perspective of the rack of FIG. 3 with a plurality of graduation caps therein, one cap protruding to illustrate how it is slid into position; and FIG. 5 is a perspective view of a loaded cap cleaner in the drum of a cleaning machine, ready for rotation.

Corresponding reference characters indicate corresponding parts throughout the several views of the drawings.

Description of the preferred embodiment

Figure 1:
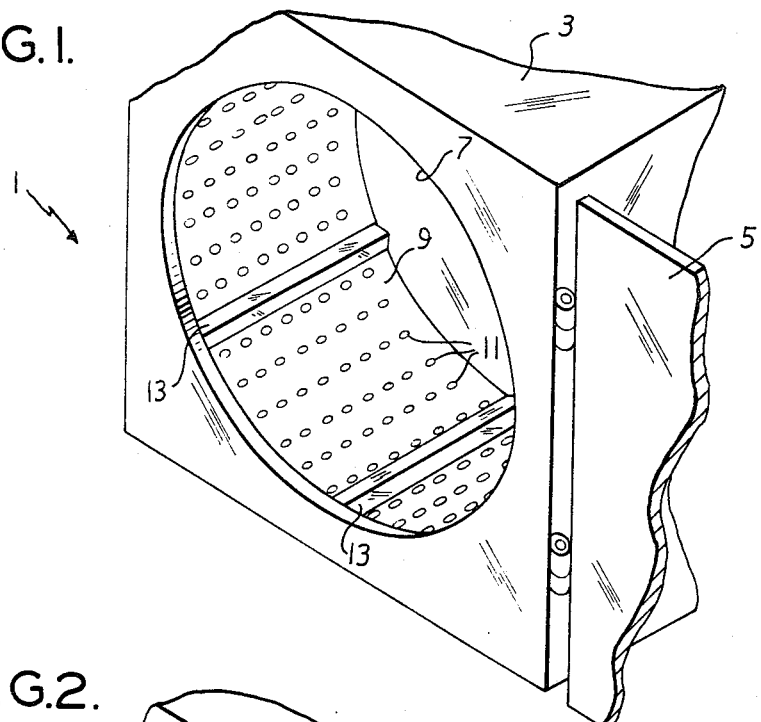
FIG. 1 is a fragmentary perspective view of a conventional front loading washing or dry-cleaning machine.

Referring now to the drawings, FIG. 1 illustrates a conventional front loading washing machine 1. This may be of the liquid dry-cleaning or wet-cleaning type, depending upon the materials of which the caps to be cleaned are composed. Usually dry-cleaning is required. The machine 1 comprises a compartment 3 having a hinged door 5 for opening and closing a loading and unloading port 7 in its front wall. A rotary drum 9 is mounted in the machine for rotation about a horizontal axis. The drum 9 is perforated throughout, as at 11, for the passage of cleaning fluid. A plurality of agitator paddles 13 are secured at spaced intervals around its inner wall. Thus, in operation of the machine 1, articles are loaded in the drum 9 through the port 7 and door 5 closed. The machine is then actuated to rotate the drum and admit cleaning fluid through the perforations to clean the articles therein. The agitator paddles ordinarily serve to tumble the articles as the drum rotates for effecting a scrubbing action to clean them. In the process they become jumbled. Such action is damaging to academic mortarboard caps.

Figure 2:
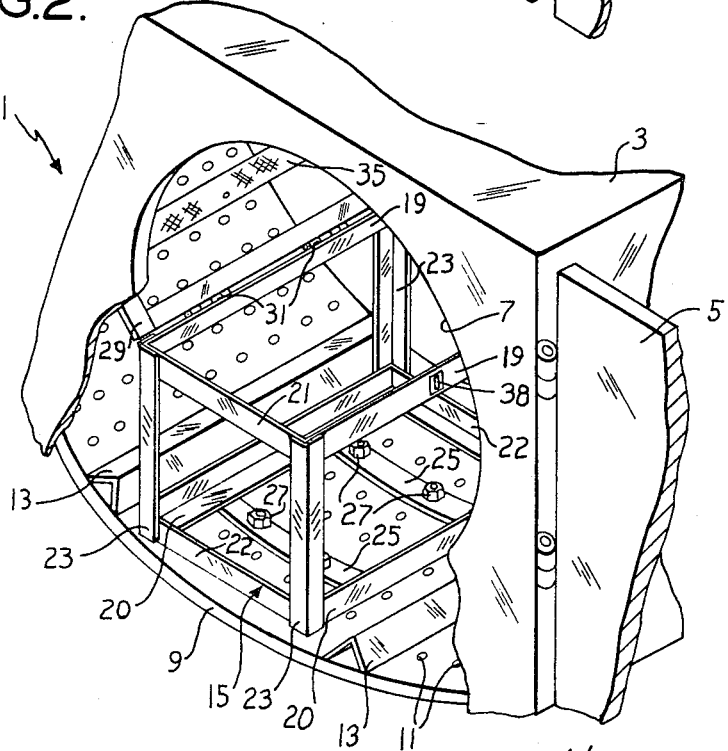
FIG. 2 is similar to FIG. 1 with an empty cage therein.

To avoid cap damage, a cleaning assembly 14 (see FIG. 5) is removably mounted in the drum 9 between each pair of paddles 13 and is comprised of a cage 15 in the form of an open rectangular or prismatic frame (FIG. 2) having a cap-holding rack 17 (FIGS. 3 and 4) removably receivable therein. As best illustrated in FIGS. 2 and 5, the cage 15 consists of pairs of top and bottom side rails 19 and 20, pairs of top and bottom ends rails 21 and 22, respectively, and four angle corner rails 23. A pair of curved bottom bars 25 are secured to the bottom rails 20, the bars conforming to the curvature of the drum 9 and having a pair of apertures registering with pairs of the perforations 11 in the drum. A pair of threaded fasteners 27 pass through perforations 11 and each of the bars 25. Thus the cage 15 is secured to the drum but may be removed as and when desired. A skeleton door or lid 29 is hingedly mounted on the left top rail 19 by a pair of hinges 31 for opening and closing the top of the frame. A crossing member 33 forms part of the lid 29. An elastic strap 35 is secured to the inside of the member 33. A latch plate 37 is secured to the front edge of the lid 29 for latching engagement with a rotary latch pin 38 on the adjacent top rail 19. Thus the cage 15 is constituted by an open skeleton framework having a skeleton door or lid hinged thereto.

Referring now to FIG. 3, the rack 17 (to be caged) is composed of side walls 39 and 40 and downwardly tapering end walls 41 and 42. A narrow bottom 43 extends between the lower narrow edges of the end walls, and a pair of carrying handles 45 are secured to the top edges. A plurality of vertical guides 47 are secured to the side walls 39 and 40. These guides form a plurality of opposed spaces or slots 49. As best illustrated in FIG. 4, each of the slots 49 is adapted slidingly to receive the square crown of a graduation cap 51 with head-engaging portions such as 53 therebetween. Each rack 17 has a snug fit in a cage 15 to minimize movement therein but is freely slidable therein for convenient insertion and removal.

The cage 15 and rack 17 are so disposed in the drum 9 that the planes of the parallel-spaced boards of the caps are substantially perpendicular to the axis of rotation of the drum 9.

Operation is as follows:

Assume that one or more of the cages 15 have been secured within the drum 9 of the cleaning machine 1 by means of the fasteners 27 passing through the perforations 11 and the apertures in the curved bars 25. If the caps are to be cleaned on a somewhat regular basis, the frames 15 may be left in the machine permanently, but if caps are to be cleaned only during certain periods, as at times of graduation, then the cages 15 may be removed between such times, so that the machine may be used for the usual cleaning by tumbling of other articles. Although only one cage has been illustrated and described, it is to be understood that a number may be used; for example, six frames may be held when the drum has six paddles with six spaces therebetween. In other words, one cage may be bolted to the drum between each pair of paddles.

A similar number of racks 17 are loaded by inserting a plurality of caps 51 in the slots 49. The loaded racks 17 may then be lifted by the handles 45 and inserted through the port 7 into the open tops of the cages 15. As they are introduced, the lids 29 are closed and latched by the latch plates 37 and pins 38 to hold the caps and racks therein. The canvas or elastic straps 35 are engaged by the upper edges of the caps 51 to cushion them as the drum rotates. The door 5 is then closed and the machine activated to cause the drum to rotate and cleaning fluid to enter the perforations. As the drum rotates, the cleaning fluid circulates through the cages 15, racks 17 and around the caps. Since the caps are spaced from one another and their planes are in the circulating plane of the drum 9, the cleaning fluid may circulate freely between individual caps to thoroughly clean the parts 51 and their head-engaging board portions 53. In the process the caps are not damaged by their tumbling. After the cleaning cycle is completed, the closed cages are successively brought into position opposite opening 7. This is accomplished by manually turning the drum 9. The doors 5 are successively opened and the lids 29 unlatched and pivoted to their open positions. The racks 17 are successively moved by grasping the handles 45 and lifting them upward out of the cages and through the port 7. The caps may then be removed and suitably racked for drying. The ability to load and unload caps into and out of the racks 17 outside of the cleaner 3 is of adavntage in that these operations may thus be more carefully performed with less cap damage than would be the case if this were required to be done without the use of racks and in the cramped space inside the drum.

Although the invention has been described and illustrated in connection with the cleaning of graduation caps, it should be understood that any similar somewhat rigidly configured articles may be cleaned by suitable modifications of the racks 17. The term cleaning machine is intended to include both dry-cleaning machines and wet-cleaning or washing machines.

In view of the above, it will be seen that the invention provides mortarboard cleaning apparatus characterized by its simplicity of construction and ease of operation and use while the revolving caps are thoroughly cleaned by the action of the cleaning fluid circulating over and between them, without damage by tumbling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Mortarboard cap-cleaning apparatus for attachment to the rotary drum of a rotary liquid cleaning machine, comprising an open cage through which liquid may circulate, means for attaching the cage to the inside of the drum, and means in the cage for removably receiving and temporarily holding caps in the cage in spaced relationship to one another.

2. Apparatus according to claim 1 wherein the boards of the spaced caps are held in substantially parallel relationship with their planes extending substantially perpendicularly to the axis of rotation of the drum.

3. Apparatus according to claim 1 including removable rack means held within the cage for holding the boards of the caps in substantially parallel spaced relationship with their planes extending substantially perpendicularly to the axis of rotation of the drum.

4. Apparatus according to claim 3 wherein the cage is of substantially prismatic form for location in the drum with its sides substantially parallel to said axis, the rack being of a form freely slidable into and out of the cage but snugly fitting therein, said rack having opposed slots for slidingly receiving the boards in parallel spaced relationship therein with the planes of the boards exposed substantially perpendicular to the axis of rotation of the drum.

5. Mortar board cap-cleaning apparatus for attachment to a perforated rotary drum of a rotary cleaning machine having a horizontal axis of rotation, comprising a cage having openings for free circulation of liquid therethrough, a mortarboard holding rack for inserting into and removal from the cage, and means for temporarily locking the rack in the cage.

6. Apparatus according to claim 5 wherein said cage is of rectangular form comprising side, end and corner rails, curved bottom bars for bolting the cage to the inside of the drum, said locking means being in the form of a hinged lid including latch means to hold it closed so as to hold captive the rack and caps, said rack comprising side and end walls, a plurality of spaced guides secured along the insides of both of said side walls for defining a plurality of opposed pairs of cap-receiving slots spacedly to hold the mortarboards in parallel-plane relationship substantially perpendicular to the axis of rotation of the drum.

7. Apparatus according to claim 6, wherein said lid includes resilient means engageable with the mortarboards when the lid is closed.

8. Mortarboard cap-cleaning apparatus for attachment to a perforated rotary drum of a rotary cleaning machine having a horizontal axis of rotation, comprising an open cage, said cage including perforations in a curved supporting part thereof for registration with certain perforations in the drum, holding bolts insertable through registered openings for removably holding the cage to the inside of the drum, a cap-holding rack for insertion into and removal from the cage, and means on the cage for temporarily locking the rack in the cage.

9. Apparatus according to claim 8 wherein the cage is of substantially prismatic form for location in the drum with its sides parallel to said axis, the rack being of a form sliding into and out of the cage and snugly fitting therein, said rack having opposed slots for slidingly receiving the boards in spaced relationship therein with the planes of the boards exposed substantially perpendicular to the axis of rotation of the drum.

References Cited

UNITED STATES PATENTS

| | | | |
|---|---|---|---|
| 1,762,665 | 6/1930 | Paris | 68—143 |
| 1,774,172 | 8/1930 | Bernardo et al. | 68—143 |
| 1,807,874 | 6/1931 | Robbins | 68—139 |
| 1,922,859 | 8/1933 | Portnoy | 68—143 |

WILLIAM I. PRICE, *Primary Examiner.*